Sept. 25, 1962 P. A. STOLL ETAL 3,055,313

AUTOMATED STORAGE EQUIPMENT

Filed June 30, 1959 6 Sheets-Sheet 1

INVENTORS
PAUL A. STOLL
EMIL UMBRICHT
BY
Pennie, Edmonds, Morton, Barrows & Taylor
ATTORNEYS Sept. 25, 1962 P. A. STOLL ETAL 3,055,313

AUTOMATED STORAGE EQUIPMENT

Filed June 30, 1959

6 Sheets-Sheet 2

INVENTORS
PAUL A. STOLL
BY EMIL UMBRICHT

Pennie, Edmonds, Morton, Barrows & Taylor
ATTORNEYS

Sept. 25, 1962 P. A. STOLL ETAL 3,055,313

AUTOMATED STORAGE EQUIPMENT

Filed June 30, 1959 6 Sheets-Sheet 3

INVENTORS
PAUL A. STOLL
EMIL UMBRICHT
BY
Pennie, Edmonds, Morton, Barrows & Taylor
ATTORNEYS

AUTOMATED STORAGE EQUIPMENT

Filed June 30, 1959 6 Sheets-Sheet 4

INVENTORS
PAUL A. STOLL
EMIL UMBRICHT
BY
Pennie, Edmonds, Morton, Barrows & Taylor
ATTORNEYS AUTOMATED STORAGE EQUIPMENT
Filed June 30, 1959 6 Sheets-Sheet 5
FIG. 11
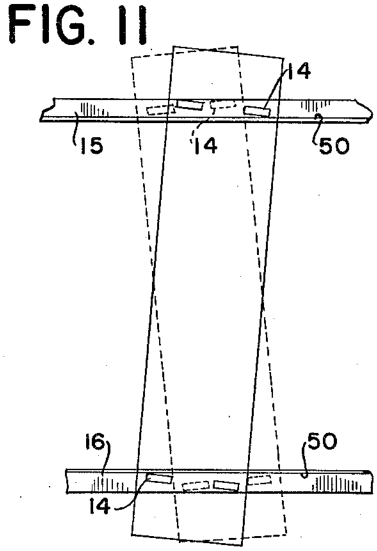
FIG. 18
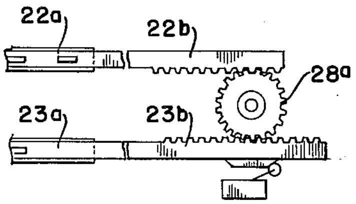
FIG. 12
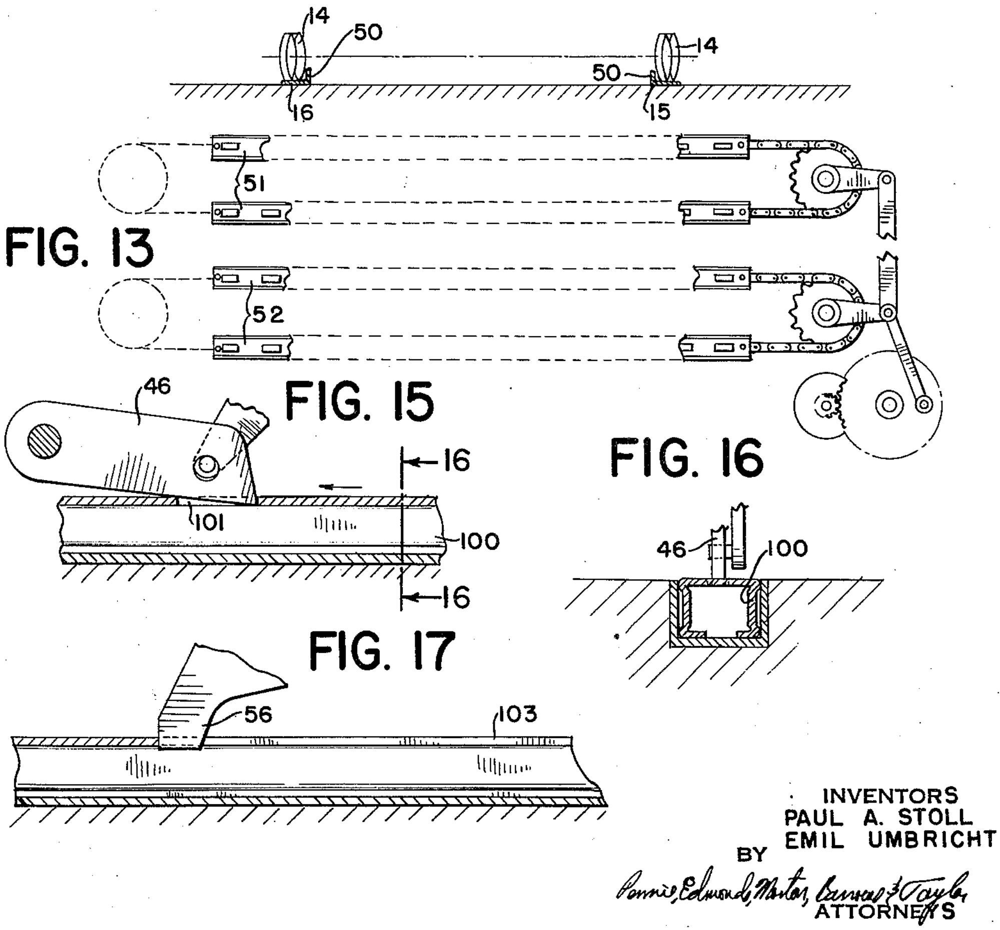
FIG. 13, FIG. 15, FIG. 16, FIG. 17
INVENTORS
PAUL A. STOLL
EMIL UMBRICHT
BY
Pennie, Edmonds, Morton, Barrows & Taylor
ATTORNEYS INVENTORS
PAUL A. STOLL
EMIL UMBRICHT
BY
Pennie, Edmonds, Morton, Barrows & Taylor
ATTORNEYS United States Patent Office 3,055,313

Patented Sept. 25, 1962

3,055,313

AUTOMATED STORAGE EQUIPMENT

Paul A. Stoll, New Milford, Conn., and Emil Umbricht, Northville, Mich., assignors to Epco, Incorporated, Milford, Conn., a corporation of Connecticut Filed June 30, 1959, Ser. No. 823,876
19 Claims. (Cl. 104—162)

The present invention relates to storage apparatus, for the storage of books, documents, parts inventories, etc., and more particularly to an improved automated form of storage apparatus enabling a plurality of storage shelves or units to be arranged in a series, with provision for a substantially smaller number of aisles than storage units.

Conventional storage apparatus, such as shelves, racks, and the like, are arranged to provide an access aisle between each pair of storage units. The aisle space thus required constitutes a very substantial portion (e.g., usually more than 60%) of the overall storage area and represents a substantial waste of floor space.

It has been proposed, heretofore, to reduce the proportion of waste floor space in a storage arrangement by providing a series of movable storage units, with space in the series for an access aisle. The storage units are movable on tracks, so that access can be provided to any unit by moving one or more of the units to form an access aisle at a selected storage unit.

While movable storage apparatus of the type described above permits of vast savings of valuable floor space and has, in addition, many obvious and important advantages, such apparatus has not come into widespread use, at least in certain important commercial areas, such as the United States, due to a number of practical problems associated with the manufacture and installation of such apparatus and its operation by relatively unskilled personnel. Accordingly, broadly speaking, the present invention seeks to provide certain specific improvements of a substantial nature in the construction and operation of movable storage apparatus.

One of the specific features of the invention resides in the provision of novel and improved power drive apparatus for moving one or more of the storage units in either direction, for a predetermined distance, in order to establish an access aisle at any point. One of the known arrangements for this purpose requires that the existing aisle be closed, by moving all units to a starting position, before a new aisle can be established. This arrangement is subject to the principal objection that substantial unnecessary time and motion is involved. Another conventional arrangement utilizes a continuous loop cable driven in one direction. The storage units may be coupled to either reach of the cable, permitting the units to be driven in either direction. The cable drive arrangement overcomes the principal disadvantage of the first described system, but is inherently limited to small, lightweight units. The apparatus of the present invention incorporates a novel drive system comprising reciprocating drive elements powered by drive means such as air or hydraulic cylinders, or electric motor means arranged for reversible or unidirectional operation. The storage units may be driven in either direction upon being coupled with the proper one of a pair of oppositely reciprocating elements. The new arrangement provides a positive and forceful drive system which avoids the disadvantages of known systems and which may be designed readily for heavy-duty or light units, as the occasion demands.

Another specific feature of the invention resides in the provision of a novel and improved drive system for automated storage equipment which is characterized by the advantages mentioned above and which may be housed substantially within the area covered by the storage units. Thus, it has been deemed necessary in the past, at least in connection with heavy-duty equipment, to accommodate at least some of the drive system adjacent one of the end storage units and outside of the storage area. The space occupied by the drive equipment, outside the storage area represents waste space and, in accordance with the present invention, such waste space is eliminated or substantially minimized by the provision of reciprocating drive bars, which underlie the entire series of storage units and which are actuated through a reciprocating stroke of less amplitude in the desired aisle space. Movement of storage units through a distance equal to one aisle space is effected by a step-by-step movement of the storage units, accomplished by coupling one or more of the storage units alternately to opposite ones of the reciprocating pull bars. The new arrangement provides for a substantially continuous positive drive of the storage units by means contained wholly or substantially within the storage area.

Another important feature of the invention resides in the provision of novel and improved safety control means for preventing operation of the storage equipment except under conditions assuring the absence of any personnel from the access aisle. To this end, safety gates or similar means are provided to obstruct entry to any access aisle. Upon opening of the gate to enter the aisle, the drive system automatically is rendered inoperative. In addition, auxiliary safety means are provided to prevent re-activation of the system upon accidental or thoughtless closing of the aisle gates. The auxiliary safety means are so arranged as to require intentional positive action on the part of an operator, in addition to closing of the safety gate, to permit further operation or movement of the storage units.

Another specific feature of the invention resides in the provision of improved control instrumentalities for automatically de-energizing the drive apparatus upon movement of one or more storage units to form a new access aisle. The improved control equipment includes a control bar arranged to be coupled with one or more storage units in response to the coupling of such unit or units to the pull bars of the drive system. The improved arrangement is characterized by its accurate and foolproof operation, as well as its overall simplicity and ease of installation.

The above and other advantageous features of the invention will be understood more fully upon reference to the following detailed specification and accompanying drawings, in which:

FIGS. 11 and 12 are schematic representations of guide means incorporated in the apparatus of FIG. 1;

FIG. 13 is a simplified, schematic representation of a modified form of drive means for optional incorporation in the apparatus of FIG. 1;

FIGS. 15–17 are enlarged, fragmentary, cross-sectional views illustrating details of a further modified form of drive means for optional incorporation in the apparatus of FIG. 1;

FIG. 18 is a fragmentary, schematic representation of a modified form of pull bar and drive arrangement for optional incorporation in the apparatus of FIG. 1.

Figure 1:
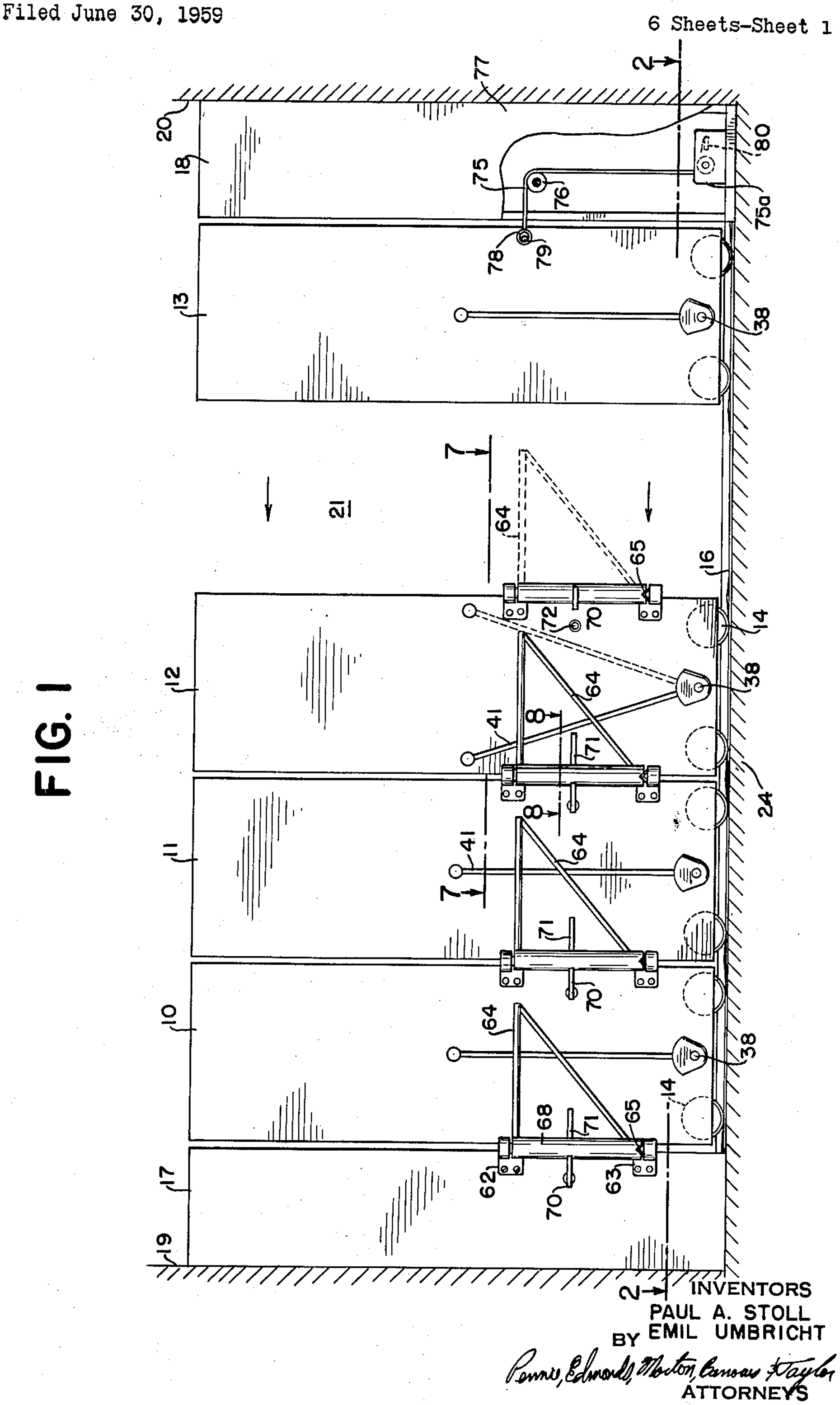
FIG. 1 is a simplified view, in side elevation, of automated storage equipment incorporating features of the invention.
Figure 2:
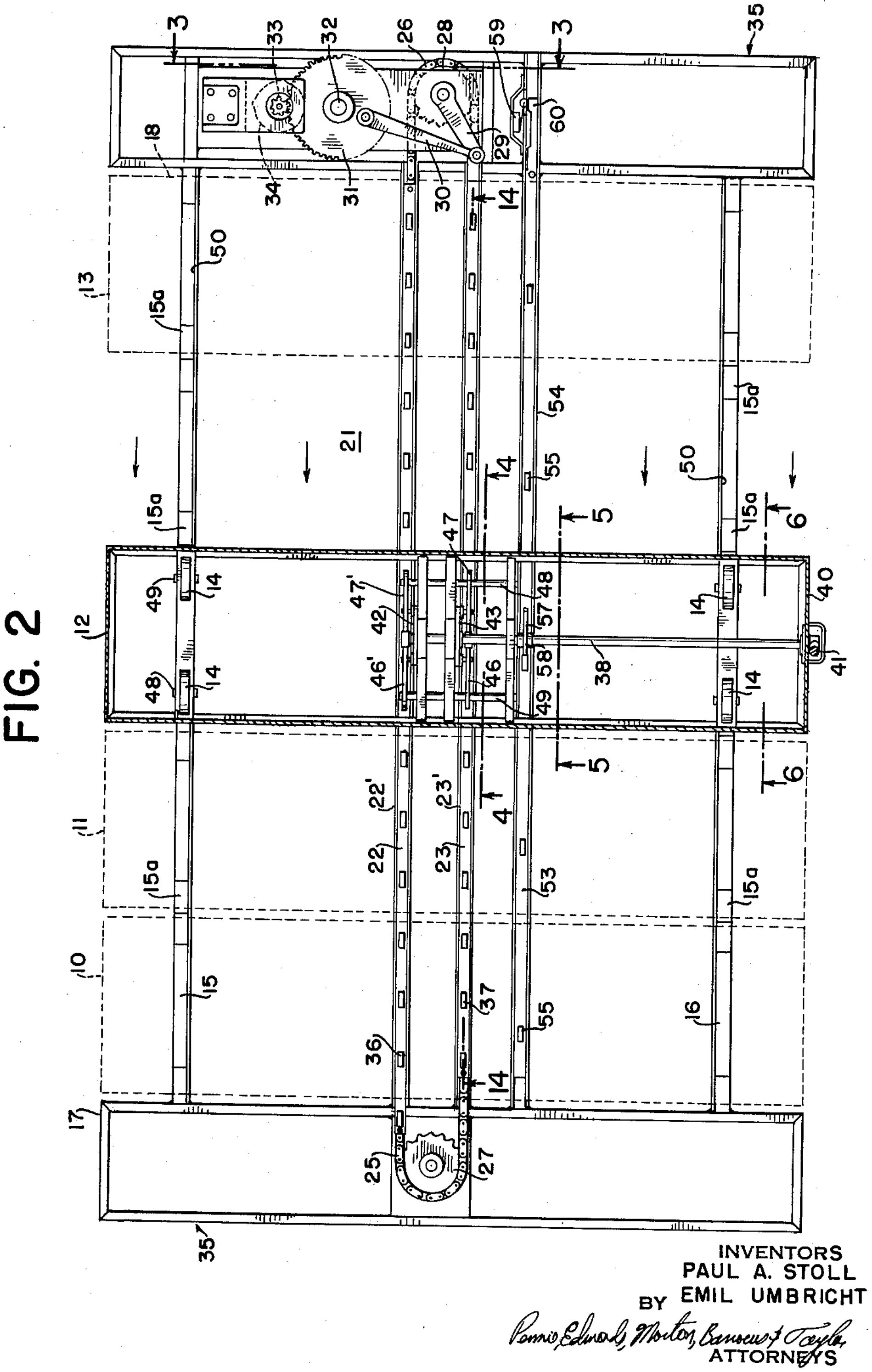
FIG. 2 is a cross-sectional view taken generally on line 2—2 of FIG. 1.

Referring now to the drawings, and initially to FIGS. 1 and 2 thereof, the automated storage equipment of the invention comprises a plurality of movable storage units 10—13, which may consist of shelves, racks, etc. The movable units 10—13 are mounted on wheels 14 for guided movement along tracks or rails 15, 16, advantageously within limits defined by fixed end storage units 17, 18. The movable storage units 10—13 advantageously may be constructed with a central dividing wall (not shown), so that each unit forms a double set of shelves or racks. The end units 17, 18 may have only one set of shelves or racks, particularly if the units abut against end walls, as shown at 19, 20. It will be understood, of course, that the particular internal design of the storage units, as well as the number thereof, is a matter of selection to suit specific desires or requirements.

In accordance with known practice, the spacing between the end storage units 17, 18 is somewhat greater than the combined length of the movable storage units 10—13 to provide aisle space for access to the storage units. In a relatively small unit, a single aisle space usually is adequate, although more than one aisle space may be provided in installations consisting of a very large number of movable units. The width of the aisle space is calculated to suit access requirements, and may be quite small if access is to be had by walking into the aisle or fairly large if it is desired to accommodate motorized equipment, such as a lift truck, for example.

As shown in FIG. 1, the storage installation is arranged with the movable units 12, 13 separated to provide an aisle space 21, and access thus may be had to the shelves or racks facing this aisle space. If it is desired to have access to the shelves or racks between the storage units 10, 11, the units 11, 12 are moved to the right, against the unit 13. In a similar manner, access may be had to the shelves or racks between any of the storage units.

In accordance with one specific aspect of the invention, an improved power drive means is provided for shifting the movable storage units 10—13 in the desired, selected manner. The improved drive means comprises a pair of pull bars 22, 23 (FIG. 2) received in channels 22′, 23′ laid on the foundation 24 and extending lengthwise underneath the entire series of movable units; that is, substantially from one end to the other of the space between the fixed units 17, 18. The channels 22′, 23′ form part of a unitary base frame structure 35 on which the storage units and drive means are mounted and within which all the operating forces are confined. Each pull bar is connected at its ends to chains 25, 26, which are passed about sprockets 27, 28 mounted in the fixed end units 17, 18. The pull bars 22, 23 thus are connected together for simultaneous movement, through a limited distance, in opposite directions.

As shown in FIG. 2, the pull bars 22, 23 are provided at uniformly spaced intervals along their respective lengths with cleats 36, 37. The spacing between the cleats advantageously is slightly less than, and in no case greater than, the stroke of the pull bars.

Fixed to the sprocket 28 is a crank arm 29 linked to a connecting rod 30 which is attached to a crank wheel 31. In the illustrated apparatus, the crank wheel 31 is in the form of a gear mounted on a shaft 32 to mesh with a pinion 33 driven by a suitable electric motor 34. The motor 34 advantageously operates unidirectionally to rotate the crank wheel 31 in one direction and the throw of the crank wheel 31 is such, in relation to the length of the crank arm 29, that continuous rotation of the crank wheel in one direction will effect reciprocating movement of the crank arm 29 and hence, reciprocating rotary motion of the sprocket 28. This in turn causes reciprocating movement of the pull bars 22, 23 through a limited distance in the guide channels therefor. Advantageously, the stroke or amplitude of movement of the pull bars 22, 23 is less than the desired width of the aisle space 21.

One advantageous modification of the pull bar drive arrangement is shown in FIG. 18. There, the pull bars *22a, 23a* are provided with racks *22b, 23b* at each end meshing with a gear *28a* substituted for the drive sprocket 28. In either of the illustrated forms of drive means, the idler sprocket 27 may be replaced by a pulley, about which is entrained a suitable cable, instead of a chain, to connect the ends of the pull bars. The arrangement, in any event, is that the pull bars are operated principally by pulling forces, rather than pushing forces.

Figure 3:
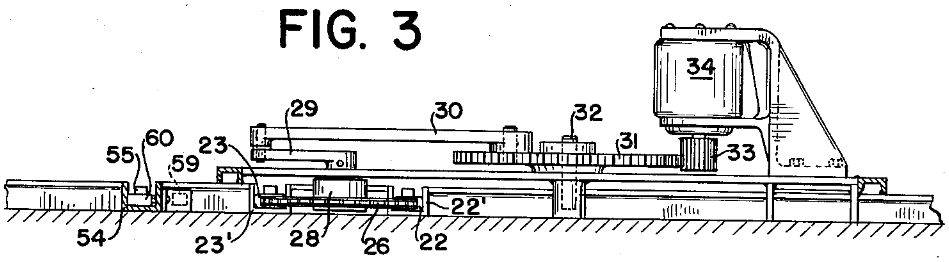
FIGS. 3–6 are enlarged, fragmentary, cross-sectional views taken along lines 3—3, 4—4, 5—5 and 6—6, respectively, of FIG. 2.

As shown best in FIG. 3, the drive mechanism, including the motor 34 and crank mechanism 29—31, is mounted on the frame structure 35, substantially or wholly within the lower portion of the end storage unit 18. The arrangement is such that ready access may be had to the mechanism for such periodic maintenance as may be required.

In accordance with the invention, each of the movable storage units 10—13 is provided with selectively operable means for coupling a movable storage unit to the pull bars 22, 23 for movement in a desired direction. Thus, with reference to FIG. 1, in order to provide an access aisle space between the storage units 10, 11, the unit 11 would be coupled to the reciprocating pull bars for movement to the right. Normally, it is unnecessary also to couple the storage unit 12 to the pull bars, as it will be pushed by the unit 11. However, it is contemplated by the invention that all units requiring movement may be coupled to the pull bars if desirable or expedient.

Figure 4:
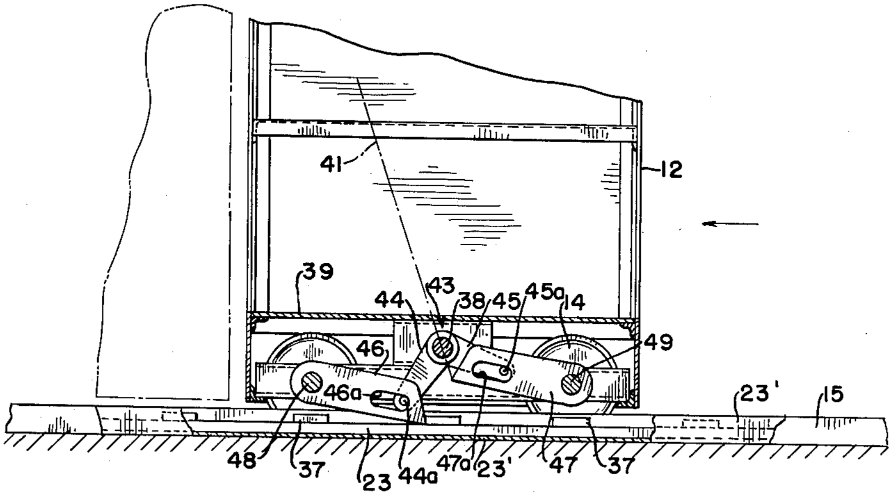

An improved arrangement for coupling a selected unit to the pull bars is illustrated in FIGS. 2 and 4. The coupling means, provided in each movable unit, comprises, in part, a control shaft 38 journalled in the unit, below a false bottom 39 provided therein. The control shaft 38 passes through an outer wall 40 of the storage unit and is connected to a manually operable control lever 41. As indicated in FIG. 1, the lever 41 has an upright or neutral position and operative positions pivoted to the left or right from neutral. As will be explained, to couple a unit with the pull bars for movement to the right, the lever 41 is pivoted to the right and, for movement of the unit to the left, the lever 41 is pivoted to the left. Appropriate detent means (not shown) may be provided, if desired, to hold the lever 41 in the described positions.

Fixed to the control shaft 38, adjacent each of the pull bars 22, 23 are cranks 42, 43, each consisting of two crank arms 44, 45, as shown in FIG. 4. Each of the crank arms 44, 45 has a pin *44a, 45a* at its outer end, by which it makes a lost motion connection to a driving pawl 46 or 47, by means of slots *46a, 47a* provided therein. The pawls 46, 47 are mounted for pivoting movement on the storage unit, as by shafts 48, 49. Each of the cranks 42, 43 operates an identical set of driving pawls 46, 47 and 46′, 47′, and the respective sets of pawls are located directly over the pull bars 22, 23.

When the control lever 41 of a unit is in its neutral or vertical position, the driving pawls are raised above the pull bars 22, 23 and the storage unit is disconnected from the drive system. In order to move the storage unit to the left, for example, the control lever 41 for the unit is shifted to the left, as indicated by the broken line in FIG. 4, and this causes the left hand pair of pawls 46, 46' to be lowered down to the pull bars 22, 23, while the other pair of pawls 47, 47' is raised. As the pull bars 22, 23 are reciprocated, the cleats 36, 37 alternately pick up the driving pawls 46, 46' to advance the storage unit substantially continuously to the left. Assuming, for example, that the unit 12, shown in FIG. 4, is ready to be moved to the left, the pull bar 23, when pulled to the left by the reciprocating crank mechanism, engages one of the pawls, say pawl 46, through the cleat 37 to drive the storage unit a distance equal to the reciprocating stroke of the pull bar. In the meantime, the pull bar 22 is moving in an opposite direction, and a ratcheting action is taking place between the cleats 36 thereof and the other pawl 46', by virtue of the lost motion connection provided between the pin **44*a* and the enlarged slot 46*a*** in the pawl.

At the end of the leftward stroke of the pull bar 23, the reciprocation of the pull bars is reversed and the pawl 46' is picked up by the now leftward moving pull bar 22, while a ratcheting action takes place with the oppositely moving pull bar 23 and the pawl 46. Thus, although the pull bars 22, 23 move in opposite directions, throughout relatively short strokes, a substantially continuous, unidirectional movement of the selected storage unit or units in the desired direction is obtained, particularly since the inertia of the moving units tends to keep the units in motion as one pull bar decelerates to zero speed and the units are picked up by the other pull bar.

Advantageously, the reciprocating stroke of the pull bars 22, 23 is an even fractional part of the desired width of the access aisle. By way of example only, in the illustrated apparatus, the pull bar stroke is approximately one-sixth the desired aisle width, so that a storage unit is moved through the desired distance in six successive pull bar strokes or three complete reciprocating cycles.

As will be understood, movement of a storage unit to the right is effected substantially as described above, upon pivoting movement of the control lever 41 to the right. Likewise, it will be understood that each of the movable storage units of the series is provided with a coupling mechanism as illustrated and described in connection with the unit 12.

One of the important advantages of the new drive arrangement resides in the fact that rigid pull bar elements may be used to transmit the driving force to selected storage units, yet it is unnecessary to provide substantial space at the ends of the installation to accommodate a long operating stroke. By providing for step-by-step movement of the storage units, through reciprocating bars whose stroke is a fraction of the desired aisle width, the entire drive mechanism may be housed substantially or wholly within the physical outline of the storage area, substantially as shown in FIG. 2.

As will be apparent in FIG. 2, the use of spaced, reciprocating pull bars for moving the storage units 10—13 necessarily results in some eccentricity of pulling force. Actually, however, such eccentricity may be relatively smaller than that which normally could be expected to arise by virtue of non-uniform loading of the storage racks or shelves. In any event, it may be expected that the application of the pulling force to the storage units will not be directly through the center of resistance, so that the unit or units coupled to the pull bars may be unstable and will tend to skew with respect to the guide rails 15, 16. The apparatus of the invention incorporates a simplified and expedient arrangement for minimizing such skewing of the movable storage units by providing guide flanges 50 along the insides of the rails. Accordingly, as illustrated in FIGS. 11, 12, if one side of the storage unit tends to move ahead of the other, the forward wheel will engage the guide flange 50, to restrain frictionally the leading side of the unit and redistribute more uniformly the resistance to the pulling force. Alternatively, the wheels 14 may be provided with flanges along their outer edges to engage the outer edges of the guide rails.

Where the movable storage units must support an unusually heavy load, as in large industrial storage installations, for example, eccentric loading of the storage units may become pronounced and could lead to objectionable tendencies for the storage units to skew on the guide tracks. In such cases, it may be desirable to provide spaced sets of pull bars 51, 52, as shown in FIG. 13. As will be understood, the storage units may be coupled simultaneously to the pull bar sets at widely spaced points. At all times, two of the pull bars driving the storage unit will act in exact synchronism, so that skewing of the unit during movement is prevented. Advantageously, the pull bars of each are spaced sufficiently to receive between them the supporting wheels for the storage units, so that the units are supported solidly in the region of the pull bars.

Figure 6:
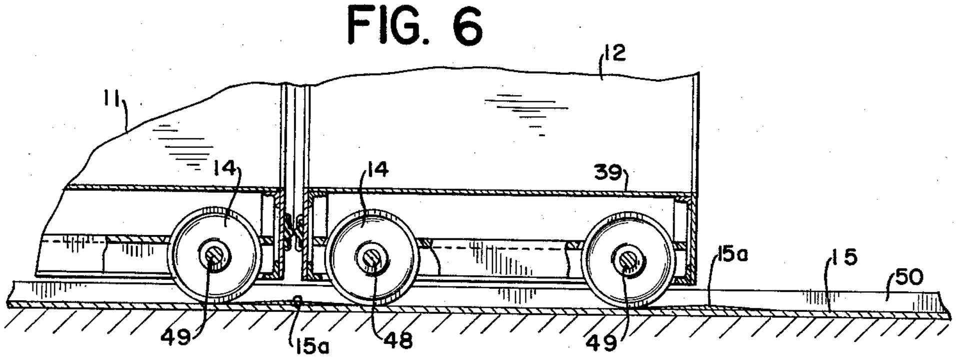

In accordance with one of the specific features of the invention, a novel and simplified arrangement is provided for maintaining the storage units in preset positions along the guide rails 15, 16. One advantageous arrangement, shown in FIG. 6, comprises spaced inclines **15*a*, spaced along the rails 15, 16 to lie between the adjacent wheels 14 of closed storage units, when the units are properly positioned on the rails. The total rise of the inclines may be a small fraction of an inch, for example, so that units coupled to the pull bars 22, 23** may be drawn over them, but is sufficient to prevent uncoupled units from rolling along the rails under the force of gravity, as where the rails are not exactly level.

Figure 10:
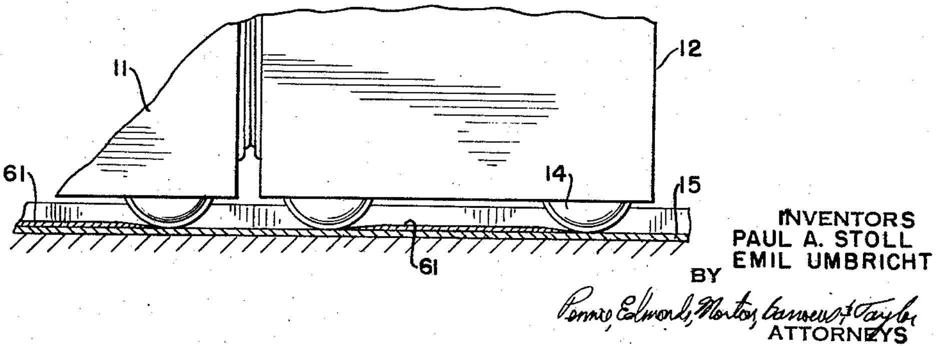
FIG. 10 is an enlarged, fragmentary illustration of a modified form of guide rail for optional incorporation in the apparatus of FIG. 1.

One advantageous alternative form of positioning means is illustrated in FIG. 10, wherein inclines 61 are provided between the spaced wheels 14 of each unit properly positioned along the rails. The alternative form of incline operates substantially in the manner described above, each unit being required to move over the incline under the influence of a substantial positive force when shifting from one position to another.

Figure 5:
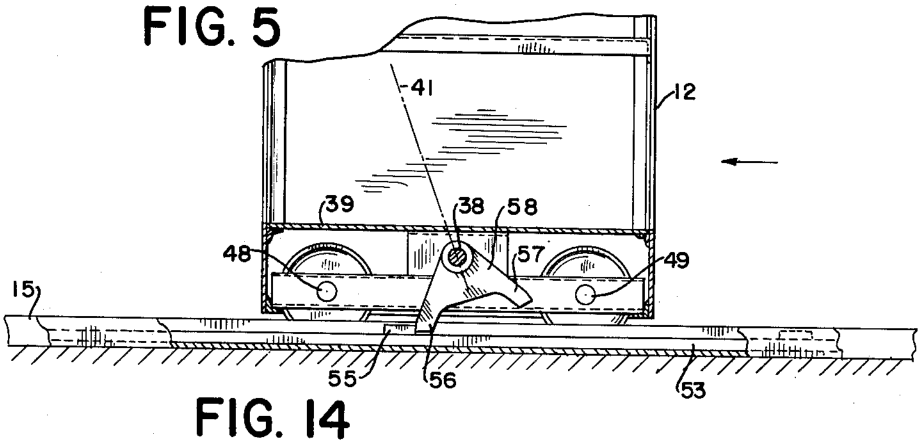
Figure 14:
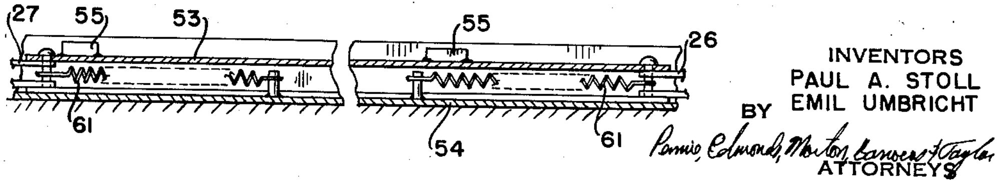
FIG. 14 is an enlarged, fragmentary cross-sectional view of a motion control mechanism incorporated in the apparatus of FIG. 1.

In the illustrated form of the invention, an improved and simplified arrangement is provided for controlling or limiting the movement of the storage units, so that the drive system is de-activated automatically after a unit, or a plurality thereof, has moved through a desired distance to provide a new aisle space. As shown best in FIGS. 2 and 5, the new control system comprises a control bar 53 received in a guide channel 54 mounted on the foundation 24. The control bar 53 is provided with cleats 55 spaced along its length and adapted to be engaged by arms 56, 57 of a control pawl 58 secured to the shaft 38. When the manual control lever 41 is shifted to the left or to the right, to effect coupling of one of the storage units to the pull bars 22, 23, the control pawl 58 is tilted, as shown in FIG. 5, so that one of the arms thereof is positioned in interfering relation to the cleats 55. The location of the cleats 55 is such that, after the storage unit has moved substantially throughout the desired distance, a cleat 55 is engaged by the lowered control arm and the control bar 53 is thereby caused to move along with the storage unit.

At an appropriate point along the control bar, advantageously at one end, there is provided a control switch 59 arranged to be actuated by a cam 60 carried by the control bar. The arrangement is such that, when the control bar is moved a short distance in either direction from a neutral position, the switch 59 is actuated to deactivate the drive system, as by stopping the motor 34. In the illustrated apparatus, suitable spring means 61 are provided to maintain the control bar 53 normally in its neutral or central position. Accordingly, as a moving storage unit nears the end of its intended movement, the control bar 53 is picked up and shifted, against the action of the spring 61, to actuate the control switch 59. When the control lever 41 is returned to its neutral position, the bar 53 is released and returns to its neutral or centered position. In the illustrated apparatus, the aisle width advantageously is substantially equal to the width of a storage unit, in which case the cleats 55 of the control bar are initially centered under the control shafts 38 of each movable storage unit. Thus, when the control lever 41 is pivoted to a coupling position, the arms 56, 57 of the control pawl 58 will be lowered on one side or the other of a cleat 55 and will travel over the control bar until engaged by an adjacent cleat.

As one of the important features of the invention, there is provided a novel and improved safety control means, forming part of the power drive for the movable storage units, which effectively prevents movement of any unit to form a new aisle space at any time when personnel or equipment is within an existing aisle space. To this end, the apparatus of the invention includes safety gate means arranged to be normally in obstructing relation to any existing aisle space. When an aisle is entered, the gate means must be opened, and this effects deactivation of the drive system through a novel safety control circuit. Moreover, in accordance with the invention, mere closing of the gate means is insufficient to re-activate the drive system. Rather, some additional, intentional act is required of the operator before further movement of the storage units is possible. This prevents re-activation of the system through thoughtless or careless action of the operator in closing the gate means behind him as he enters an aisle.

Referring again to FIG. 1, the movable storage units 10—12 and the stationary unit 17 each are provided with gate mounting means in the form of hinge brackets 62, 63. Each set of hinge brackets mounts a gate 64 for pivoting movement between a closed position, extending parallel to the series of storage units, and an open position, extending into an aisle, generally at right angles to the open position. In their closed positions, the gates 64 extend along the outside walls of adjacent storage units or, where an aisle space is provided, substantially across the open end of the aisle space so as to obstruct access thereto.

Advantageously, each of the gates 64 is mounted for pivoting movement between defined or known positions and, for this purpose, each of the lower hinge brackets is provided with a detent element 65, which may be in the form of an angle iron section mounted with its apex pointing up. The element 65 is adapted to be received in one of two notches 66, 67, of inverted V shape, formed in the lower end of a tubular element 68 forming part of the gate 64. The hinge means for each gate includes means such as a vertical shaft 69, providing limited vertical movement of the gate, to accommodate movement of the detent element 65 into and out of the notches 66, 67 as the gate is pivoted. If desired, springs (not shown) may be provided to urge the gates downward; however, the weight of the gates usually will be sufficient to achieve the desired detent action.

Figures 7, 8, 9:
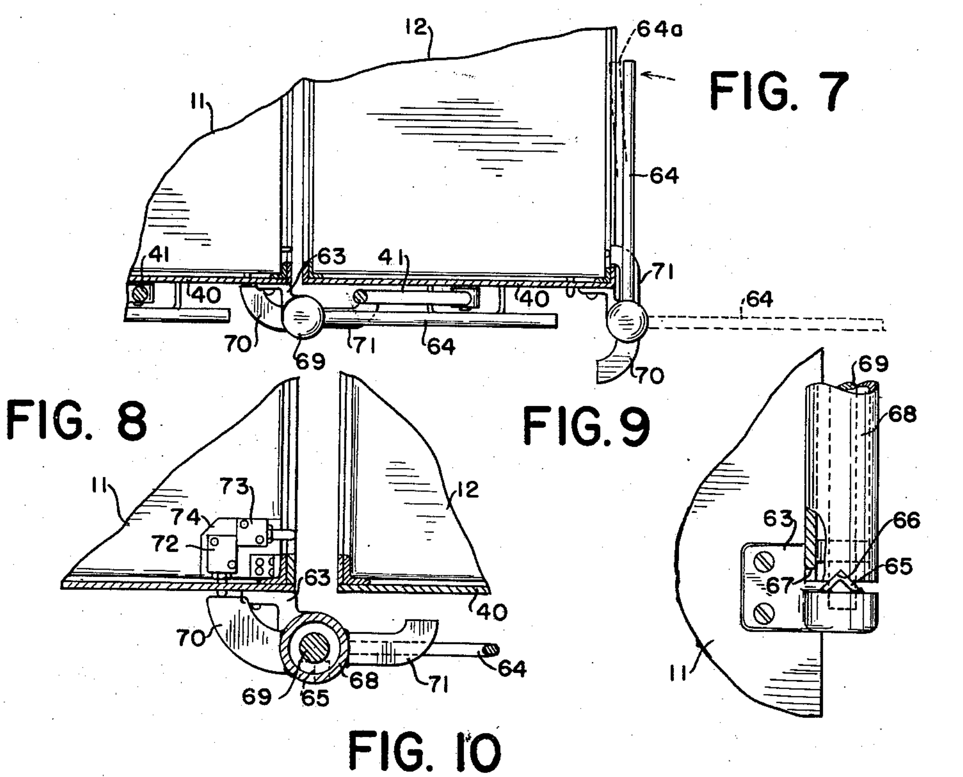
FIG. 7 is a fragmentary, cross-sectional view taken generally on line 7—7 of FIG. 1, illustrating details of a safety gate apparatus incorporated in the equipment of FIG. 1.
FIGS. 8 and 9 are enlarged, fragmentary views illustrating further details of the safety gate apparatus shown in FIG. 7.

As shown best in FIG. 8, each gate is provided with auxiliary arms 70, 71 positioned for engagement with the actuator elements of switches 72, 73, respectively, which may be mounted on a bracket 74 inside the storage units. When the gate is open, as shown in FIG. 8, the switch 72, which may be referred to as a gate switch, is actuated by the arm 70. However, in accordance with the invention, the switch 73, which may be referred to as a safety switch, is not actuated by movement of the gate to its open detent position, but is actuated only when the gate is moved forcibly past its open detent position, to the position shown in broken lines at *64a* in FIG. 7.

As will be described in more detail below, opening of any gate de-activates the drive system by opening one of the gate switches 72. However, re-activation of the drive system is not accomplished merely by re-closing the gate switch, but requires a sequential closing of the safety and gate switches 73, 72. This provides a substantial measure of safety against activation of the drive system while any personnel or equipment is in an aisle, since a positive, intentional act is required to close the safety switch 73.

In an apparatus of the type illustrated in FIG. 1, the right hand end unit 18 may not be of sufficient depth to permit the use of a gate 64 of sufficient size to close off an aisle space effectively and, if such is the case, an alternative form of gate means may be provided. The alternative gate means may take the form of a cable 75 carried by a spring reel *75a* mounted in the base of the fixed storage unit 18. The cable extends from the reel, over a pulley 76 mounted on the inside wall 77 of the unit 18, and through an appropriate opening (not specifically shown) in the wall 77. At the end of the cable is a hand ring 78, for example, adapted to be attached to a pin 79 projecting from the wall of the adjacent movable storage unit 13.

A "gate" switch 80 is associated with the spring reel and arranged to be actuated thereby and to be opened when the ring 78 is removed from the pin 79 permitting the spring reel to retract the cable 75. When an aisle space is provided between the units 13, 18, access to the aisle normally is prevented by the cable, which extends across the open end of the aisle. When the cable is removed from the pin 79 and permitted to retract, in order to gain entry to the aisle, the switch 80 is opened to de-activate the drive system. Re-activation of the system requires sequential closure of a safety switch 81 (FIG. 19) and the gate switch 80, substantially as before described, closure of the switch 81 involving a positive, intentional act of the operator.

As will be understood, a variety of forms of safety gate means may be provided within the purview of the foregoing disclosure. Likewise, certain variations in the safety control may be desirable in appropriate cases. One such variation is to provide for the operation of the safety switches 73, 81 by means of a key, so that unauthorized operation of the switches would be prevented.

One of the specific features of the invention resides in the provision of a novel control circuit for use in conjunction with the safety and other control means of the invention. In the illustrated control circuit, shown in FIG. 19, the drive motor 34 is arranged to be connected to a three-phase or other suitable power source 82 through conductors $L_1$, $L_2$, $L_3$ and normally open contacts of a power relay 83. Operation of the motor 34 is initiated by energizing the coil of the power relay 83, through a control circuit including a control power source 84 and a main control switch 85.

One side of the power relay 83 is connected to the source 84 directly through a conductor 86 and the switch 85, while the other side of the coil is connected to the source through normally closed contacts *59a* of the motion limit switch 59, normally open contacts *87d* of a control relay 87, normally closed contacts *88c* of a safety relay 88, conductors 89, 90, and the control switch 85. Accordingly, the drive system is activated upon energization of the control relay 87 and de-energization of the safety relay 88, and will remain activated until the limit switch 59 is opened upon completion of the shifting of one or more of the movable storage units 10—13.

The energization circuit for the control relay 87 comprises conductors 86, 91, from the source, normally open contacts *88b* of the safety relay 88, conductors 92, 93, each of the gate switches 80, 72 in series, and conductor 90 to the source. Actuation of the control relay thus requires prior energization of the safety relay 88 and closure of each one of the gate switches. Once energized, however, the control relay holds independently of the safety relay 88, through a holding circuit including normally open contacts *87a*.

Energization of the safety relay 88 is effected through a circuit including conductors 86, 91, to the source, normally closed contacts 87*c* of the control relay 87, conductors 94, 95, any closed one of the safety switches 73, 81 connected in parallel, all of the gate switches 72 toward the source (e.g., physically, to the left in FIG. 19) from the closed safety switch, and conductor 90 to the source. Once energized, the safety relay 88 holds independently of the safety and gate switches, through a circuit including normally open contacts 88*a* and normally closed contacts 96*a* of a holding relay 96. The holding relay 96 has an energizing circuit in parallel with the holding circuit for the control relay 87, through normally open contacts 87*b*, so that the holding relay is energized immediately after the control relay and remains energized as long as the control relay is held.

Figure 19:
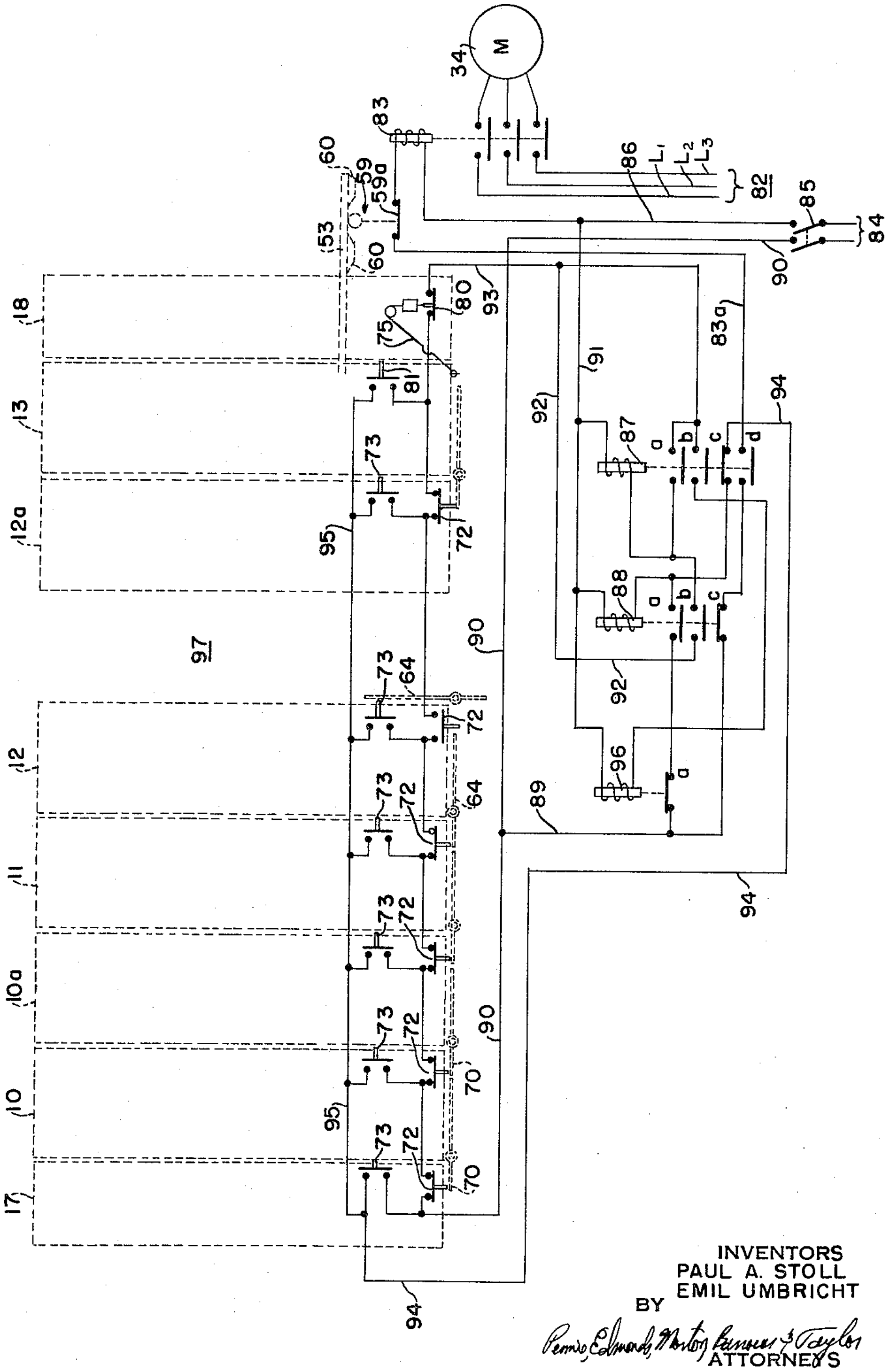
FIG. 19 is a simplified, schematic representation of a novel safety control system for use in conjunction with the apparatus of FIG. 1.

In describing the operation of the system, it may be assumed that the initial condition or disposition of the equipment is as shown in FIG. 19 and that it is desired to shift the unit 12 to the right to provide an aisle space between the units 11, 12. The control switch 85 is closed to provide control power, and it may be desirable to provide a key-operated switch, for example, for this purpose to prevent unauthorized operation of the equipment.

As the equipment is illustrated in FIG. 19, it may be assumed that an operator initially is in the aisle space 97 between the units 12, 12*a*. The drive system is de-activated by reason of the open gate switch at the aisle, which maintains the control relay 87, and hence the power relay 83, de-energized.

When the operator leaves the space 97, he first pushes the open gate 64 beyond its open detent position to effect closure of the safety switch 73 in the storage unit 12. This completes the energization circuit for the safety relay 88, which now holds independently of the safety switch. The operator then swings the gate 64 closed behind him as he leaves the aisle, which effects closure of the gate switch 72 in the unit 12. All gate switches 72, 80 are now closed, causing, in sequence, energization of the control relay 87, energization of the holding relay 96, de-energization of the safety relay 88, and energization of the power relay 83. The motor 34 is thereby energized, causing a continuous reciprocation of the pull bars 22, 23 on a standby basis.

To shift the storage unit 12 to the right, its control lever 41 is swung toward the right, lowering the pawls 47, 47′ into position to engage the pull bar cleats 36, 37. The unit 12 is thereby caused to move in a step-by-step but otherwise continuous manner toward the unit 12*a*.

As the unit 12 nears the unit 12*a*, the control bar 53 is picked up by engagement of the arm 57 with a control bar cleat 55 and is shifted to the right until the switch 59 is opened by the control bar cam 60. At this point, the power relay 83 is de-energized and the motor 34 is shut down. In other respects the control circuitry is in a standby condition and the operator may change the aisle position at will merely by uncoupling the unit 12 from the pull bars and control bar, allowing the control bar to return to its neutral position, and coupling a different unit for movement in the proper direction (i.e., toward the existing aisle space).

When an operator enters the new aisle space, he first must open the gate 64 (or release the cable 75) blocking the entrance to the aisle. This action causes the associated gate switch 72 (or 80) to open, de-energizing the control and holding relays 87, 96 and thereby de-activating the entire drive system. Re-activation of the system through inadvertence or carelessness virtually is precluded, because it requires the positive, intentional and to some extent unnatural act of the operator in pushing the gate 64 past its open detent position before closing it or, in the case of the cable gate 75, in specially closing the safety switch 81 before drawing the cable to its aisle-closing position.

The new control system, while being essentially simplified in nature, is substantially foolproof in its operation. Moreover, it does not depend, for its safety aspects, upon requiring operation of the equipment by only a single authorized individual, for example, or other arrangement tending to impair full efficiency of the installation.

An advantageous mechanical arrangement for alternative incorporation in the apparatus of FIG. 1 is illustrated in FIGS. 15–17. FIGS. 15, 16 illustrate details of an alternative form of pull bar comprising an inverted channel member 100 having, instead of projecting cleats, slots or openings 101 for receiving the driving pawls 46, 47. The length of the slot is sufficient to admit a portion of the driving pawl, so that driving engagement is established between the pawl and the end of the slot. FIG. 17 illustrates an alternative form of control bar which, like the pull bar of FIGS. 15, 16, is formed of an inverted channel 102. Slots 103 of substantial length are provided in the control bar to receive control arms 56, 57. The mode of operation is the same as previously described.

As should be apparent, the automated storage equipment of the invention incorporates many advantageous features providing a generally simplified installation, from a structural as well as a control consideration, yet affording improved efficiency in operation and highly effective safety control. The use of the described reciprocating pull bar drive system constitutes a substantial improvement, particularly in respect of heavy-duty storage installations, by affording a direct, positive drive means which, on the one hand, does not occupy substantial space outside the plan area of the installation and, on the other, enables the units to be moved directly to a new position without first having to be returned to a starting position. The improved safety features, while affording full protection of operating personnel, is of a simplified nature and may be incorporated readily into the structure and into the operating control.

It should be understood, however, that the specific forms of the invention illustrated and described herein are intended to be representative only, as certain changes may be made therein without departing from the clear teachings of the disclosure. Accordingly, reference should be made to the following appended claims in determining the full scope of the invention.

We claim:

1. Automated storage apparatus comprising a plurality of storage units, means mounting the storage units in a series for movement along a common axis normal to the sides of the storage units, said storage units having sides which when accessible permit the storage of material in said units, the units being movable to positions where the sides are immediately adjacent to the sides of juxtaposed units and being movable to positions in which at least one aisle space is opened between juxtaposed units of a series to provide access to a unit, a pair of pull bars disposed adjacent the storage units and extending substantially from one end to the other of the series thereof, means for effecting simultaneous reciprocation movement of the pull bars in opposed directions through a limited distance, and means for coupling each of said storage units selectively to each of said pull bars alternatively when they are moving in the same selected direction.

2. The apparatus of claim 1, in which the drive means comprises a unidirectionally operating motor, and reciprocating crank means connecting the motor to the pull bars.

3. The apparatus of claim 1, in which the amplitude of reciprocation of the pull bars is less than the width of an aisle space to be formed between storage units, and the coupling means comprises means for engaging alternately both pull bars of the pair to effect substantially continuous step-by-step movement of storage units in a desired direction.

4. The apparatus of claim 1, in which the aisle width is substantially equal to a multiple of the amplitude of reciprocation of the pull bars.

5. The apparatus of claim 1, in which the pull bars are connected at their adjacent ends by flexible members, pulleys are mounted adjacent the ends of the series of storage units, and the flexible members are trained about the pulleys.

6. The apparatus of claim 1, in which the pull bars are disposed closely adjacent the central axis of the series of storage units, the mounting means for the storage units comprises tracks disposed on opposite sides of and spaced substantially from the central axis and wheels mounted on the storage units for cooperation with the tracks, and cooperating flange means are provided on the tracks for effecting frictional engagement between inwardly facing surfaces of certain of the wheels of a unit and outwardly facing surfaces of the tracks, upon skewing of the unit during movement thereof, to tend to align the unit on the tracks.

7. The apparatus of claim 1, which includes a plurality of pairs of pull bars, the respective pairs being disposed on opposite sides of the central axis of movement of the storage units, and the coupling means comprises means for coupling one of the storage units simultaneously to one pull bar of each pair.

8. Automated storage apparatus comprising a plurality of storage units, means mounting said storage units in a series for movement along a common axis, a pull bar extending adjacent the series of storage units, drive means for effecting reciprocatory movement of the pull bar, the amplitude of reciprocating movement being less than the width of an aisle space to be formed between storage units, and a selectively operable coupling means including ratchet-like means carried by each unit for coupling any one of the storage units to the pull-bar, said ratchet-like means being operative to engage the pull-bar to move the unit in one of the directions of reciprocatory movement during movement of the pull-bar in the one direction and to be disengaged from said pull-bar during reverse movement of the pull-bar.

9. The apparatus of claim 8, which includes control means rendered effective by operation of the coupling means to de-energize the drive means in response to predetermined movement of a coupled storage unit.

10. The apparatus of claim 9, in which the control means comprises a control element extending adjacent the series of storage units, and the coupling means includes means for coupling a selected storage unit to the control element.

11. In an automated storage apparatus of the type comprising a plurality of storage units, means mounting the storage units in a series for movement along a common axis, drive means for moving selected ones of the storage units to ofrm an access aisle, and safety control means for de-activating the drive means at selected times, an improvement in said safety control means comprising gate means mounted on certain of the storage units and normally disposed in a closed position to prevent entry into an access aisle, first control means actuated by opening movement of the gate means to de-activate the drive means, and second control means effective following opening movement of the gate means to maintain the drive means in a de-activated condition independently of the first control means, said first and second control means being operative to re-activate the drive means upon sequential actuation of the second control means and the first control means.

12. The apparatus of claim 11, in which the gate means comprises a hinged gate movable between closed and open positions, said first control means being arranged for actuation upon movement of the gate to open position, and said second control means being arranged for actuation by movement of the gate in an opening direction beyond its open position.

13. In an automated storage apparatus of the type comprising a plurality of storage units, means mounting the storage units in a series for movement along a common axis, drive means for moving selected ones of the storage units to form an access aisle, and safety control means for de-activating the drive means at selected times, an improvement in said safety control means comprising first control means operative upon entry of an object into an access aisle to de-activate the drive means, second control means operable independently of entry into or exit from an access aisle, and circuit means interrelating the control means whereby the drive means is re-activated upon sequential actuation of the second control means and the first control means.

14. In an automated storage apparatus of the type comprising a plurality of storage units, means mounting the storage units in a series for movement along a common axis, drive means for moving selected ones of the storage units to form an access aisle, and safety control means for de-activating the drive means at selected times, an improvement in said safety control means comprising first and second control means operable, respectively, from outside and inside an access aisle, first circuit means for de-activating the drive means upon operation of the first control means, and second circuit means for re-activating the drive means upon subsequent operation of the second and first control means in sequence.

15. The apparatus of claim 14, in which the drive means comprises an electric motor, a power relay is connected in the power circuit for the motor, the first circuit means includes a first control relay having normally open contacts in the energizing circuit for the power relay, the second circuit means includes a second control relay having normally closed contacts in the energizing circuit for the power relay and the first and second control means comprise switch means for actuating the control relays.

16. In an automated storage apparatus of the type comprising a plurality of storage units, means mounting the storage units in a series for movement along a common axis, drive means for moving selected ones of the storage units to form an access aisle, and safety control means for de-activating the drive means at selected times, an improvement in said safety control means comprising gate means normally positioned in obstructing relation to an access aisle formed between two storage units, control means for de-activating the drive means upon movement of the gate means in an opening direction out of obstructing relation, and means effective to preclude re-activation of the drive means by closing movement of the gate means except upon prior excessive movement of the gate means in an opening direction.

17. In an automated storage apparatus of the type comprising a plurality of storage units, means mounting the storage units in a series for movement along a common axis, drive means for moving selected ones of the storage units to form an access aisle, and safety control means for de-activating the drive means at selected times, an improvement in said safety control means comprising gate means normally positioned in obstructing relation to an access aisle formed between two storage units, control means for de-activating the drive means upon movement of the gate means in an opening direction out of obstructing relation, and means effective to preclude re-activation of the drive means by closing movement of the gate means except upon prior movement of the gate means in a direction other than toward obstructing position.

18. Automated storage apparatus comprising a plurality of storage units, means mounting said storage units in series for movement along a common axis, a pull bar extending adjacent the series of storage units, drive means acting upon opposite ends of the pull bar for effecting reciprocating movement thereof by the application of pulling forces to the pull bar and selectively operable coupling means including means carried by each unit for coupling any one of the storage units to the pull-bar, said coupling means being operative to engage the pull-bar to move the unit in one of the directions of reciprocatory movement during movement of the pull-bar in the one direction and to be disengaged from said pull-bar during reverse movement of the pull-bar.

19. Automated storage apparatus comprising a plurality of storage units, means mounting the storage units in a series for movement along a common axis normal to the sides of the storage units, the sides of said storage units facing in a generally horizontal direction along the common axis, and the sides being accessible to permit the storage of material in said units when an aisle space is provided between units, the units being movable to positions where the sides are immediately adjacent to the sides of juxtaposed units and being movable to the position in which at least one aisle space is opened between juxtaposed units of a series to provide access to a unit, the absence of an aisle space prohibiting access to said units, at least one pull-bar extending adjacent to the series of storage units and extending substantially from one end to the other of the series thereof, drive means acting upon opposite ends of the pull-bar for effecting reciprocatory movement thereof by the application of pulling forces to the pull-bar and selectively operable coupling means including means carried by each unit for coupling any one of the storage units to the pull-bar, said coupling means being operative to engage the pull-bar to move the unit in one of the directions and to be disengageable from said pull-bar during reverse movement of the pull-bar.

References Cited in the file of this patent

UNITED STATES PATENTS

| | | |
|---|---|---|
| 2,065,107 | Turner et al. | Dec. 22, 1936 |
| 2,321,253 | Schellentrager | June 8, 1943 |
| 2,645,186 | Davis | July 14, 1953 |
| 2,707,442 | Ingold | May 3, 1955 |
| 2,847,945 | Merritt | Aug. 19, 1958 |
| 2,961,973 | Bozman | Nov. 29, 1960 |